US011371838B2

United States Patent
Jara Rodelgo

(10) Patent No.: US 11,371,838 B2
(45) Date of Patent: Jun. 28, 2022

(54) METHOD FOR SIMULATING SURFACE ROUGHNESS ON AN AIRCRAFT

(71) Applicant: AIRBUS OPERATIONS S.L., Madrid (ES)

(72) Inventor: Alvaro Jara Rodelgo, Madrid (ES)

(73) Assignee: Airbus Operations S.L., Madrid (ES)

(*) Notice: Subject to any disclaimer, the term of this patent is extended or adjusted under 35 U.S.C. 154(b) by 0 days.

(21) Appl. No.: 17/005,958

(22) Filed: Aug. 28, 2020

(65) Prior Publication Data

US 2021/0063147 A1 Mar. 4, 2021

(30) Foreign Application Priority Data

Aug. 30, 2019 (EP) .................................... 19382738

(51) Int. Cl.
*G01B 11/30* (2006.01)
*G01M 5/00* (2006.01)

(52) U.S. Cl.
CPC ........... *G01B 11/30* (2013.01); *G01M 5/0016* (2013.01)

(58) Field of Classification Search
CPC .............................. G01B 11/30; G01M 5/0016
See application file for complete search history.

(56) References Cited

U.S. PATENT DOCUMENTS

| 9,696,238 B2 * | 7/2017 | Bosetti .................. G01M 17/00 |
| 2006/0051592 A1 | 3/2006 | Rawlings et al. | |

FOREIGN PATENT DOCUMENTS

| AT | 519954 | * 12/2018 | ............ G01M 13/04 |
| CN | 109 657 275 | 4/2019 | |
| WO | 2019/013992 | 1/2019 | |

OTHER PUBLICATIONS

Wisely Laser Marking Machine User Manual, 2014 (Year: 2014).*
Prasetyani and Priambodo, 450nm Laser diode beam shaping in engraving process, 2017 15th International Conference on Quality in Research (QiR) : International Symposium on Electrical and Computer Engineering (pp. 114-119) (Year: 2017).*
Kari Eloranta, Archimedean Ice, arXiv:0909.4007, Sep. 22, 2009 (Year: 2009).*
Extended Search Report for EP19382738.3, dated Jan. 3, 2020, 7 pages.
Broeren et al., "Aerodynamic Classification of Swept-Wing Ice Accretion", NASA/TM—2013-216381, pp. 1-44.
Sermeus et al., "CFD Simulation of Aircraft Icing Effects using Roughness Modeling", Proc. of 62nd CASI Aeronautics Conference, Montreal, QC, May 19-21, 2015, 10 pages.

(Continued)

*Primary Examiner* — Natalie Huls
*Assistant Examiner* — Cynthia L. Davis
(74) *Attorney, Agent, or Firm* — Nixon & Vanderhye P.C.

(57) ABSTRACT

A method for simulating surface roughness on an aircraft part surface and a method for testing the behavior on flight of this aircraft part with surface roughness simulated, wherein the surface roughness simulation includes forming a roughness pattern on the aircraft part surface using a laser. The roughness pattern is a projectable lattice including longitudinal projections and transverse projections, wherein heights of the longitudinal and transverse projections correspond to a maximum roughness of a selected surface roughness type.

19 Claims, 5 Drawing Sheets

(56) References Cited

OTHER PUBLICATIONS

Gouttebroze et al., "Canice—Capabilities and Current Status", NATO/RTO Workshop, CIRA in Capua, Italy, Dec. 6-7, 2000, 12 pages.
"FAA Inflight Aircraft Icing Plan", United States Department of Transportation, Federal Aviation Administration, Apr. 1997, 59 pages.
Saeed, "State-of-the-Art Aircraft Icing and Anti-Icing Simulation", ARA Journal, vol. 2000-2002, No. 25-27, pp. 106-113.

* cited by examiner

METHOD FOR SIMULATING SURFACE ROUGHNESS ON AN AIRCRAFT

RELATED APPLICATION

This application claims priority to European Patent Application EP 19382738-3, filed Aug. 30, 2019, the entirety of which is incorporated by reference.

FIELD OF THE INVENTION

The present invention belongs to the field of aircraft structures and, more particularly, to the field of surface roughness formed on surfaces of an aircraft part.

BACKGROUND

There are known examples where the roughness of a surface on an aircraft exposed to atmospheric airflow plays an important role in the operation and performance of an aircraft. For example, surface roughness can increase due to ice accumulations, e.g., accretions, and pollution on the surfaces of a wing of an aircraft. An increase in surface roughness can result in degradation the aerodynamic performance of the aircraft and cause local flow perturbations of the airflow over the surface. Increased surface roughness formed during the initial stages of icing on a wing can degrade the aerodynamic performance of the wing. For example, the increase in surface roughness enhances the local convection at the wing surface which leads to more rapid ice formation. The increased surface roughness may also generate local airflow perturbations over the wing surface that leads to higher skin (surface) friction and potentially forces the boundary-layer airflow over the wing, such as near the leading edge, to prematurely transition to turbulence.

The amount and rate of ice accretion on a wing depends on, for example, meteorological and aerodynamic conditions, liquid water content, temperature, droplet diameter and rate of catch. The ice formations on wings and other aircraft surfaces (2) may have many shapes, textures, and shades. These ice shapes have been broadly classified on a thermal basis as rime ice (−15° C. to −40° C.), glaze ice (0° C. to −10° C.), and mixed ice (−10° C. to −15° C.). There are also known general ice type classifications including roughness ice, small ice, double horn ice, and ridge ice. The two main ice shapes are double horn ice (8 in FIG. 1) and the roughness ice (9 in FIG. 2). These classifications of ice shapes are of special interest for simulating ice accretion on aircraft part surfaces and to check the aerodynamic behavior of the aircraft part in response to the ice accretion. Until now, most attention was directed to the double horn ice or roughness ice shapes. It has been demonstrated that roughness penalties due to roughness ice shapes should not be underestimated.

To simulate surface roughness due to ice, two main parameters are typically used to characterize the surface roughness. These parameters are the height and density of the ice roughness on the surface of the aircraft part.

It is conventional to study and test the aerodynamic behavior of aircraft parts due to changes in surface roughness by manually applying various levels of roughness to the surface or by manually simulating various levels of roughness on the surface. This approach requires manual work to apply the surface roughness and thus is subject to variations because it is human dependent.

Typically the surface roughness has been simulated manually by blowing microspheres or carborundum on an aircraft surface after a glue or a lacquer is applied to the surface. This technique has the disadvantage that even though the parameter of roughness height can be set by choosing the right size of the microspheres or carborundum, the parameter of roughness density is very difficult to control given that the process is completely manual. That is, these known manual techniques do not accurately simulate the surface roughness desired.

Moreover, recently, the blowing process has been replaced by using compressed air guns to apply the microspheres or carboundum to a surface to obtain a better flow control. However, since the surface roughness is still manually applied by moving the air gun by an operator, the density parameter is still fully controlled.

SUMMARY

The invention disclosed herein solves an existing issue of accurately simulating ice roughness to later study on a wind tunnel the behavior of the aircraft part on which the ice roughness is simulated. Particularly, the present invention provides a new way of roughness application by laser technology wherein the ice shape is directly integrated on the aircraft part surface into the wind tunnel model.

The invention may be embodied as methods for simulating surface roughness on an aircraft part surface and testing the behavior on flight of this aircraft part with surface roughness simulated. The surface roughness simulation may comprise forming a roughness pattern on the aircraft part surface by a laser.

In a first inventive aspect, the invention may be a method for simulating a surface roughness type on a surface of at least an aircraft part, the method comprising the following steps: selecting a type of surface roughness to be simulated, providing parameters associated to the selected surface roughness type, wherein the parameters include a maximum roughness and a density of the surface roughness type, obtaining a pattern according to the parameters, providing an aircraft part having a surface thickness higher than the maximum roughness parameter, and forming the pattern on at least a portion of the surface of the aircraft part by means of a laser to simulate the selected roughness type simulated; wherein the pattern is a projection lattice comprising a plurality of longitudinal projections and a plurality of transverse projections being perpendicular to the longitudinal projections, both pluralities of projections having a height corresponding to the maximum roughness of selected surface roughness type, so that where each two consecutive longitudinal projections intersect with two consecutive transverse projections a recess is formed.

The invention may be embodied as a method to simulate surface roughness on an aircraft part. The proposed method may be configured to simulate ice roughness, dust or pollution roughness and insect accretion roughness. When an aircraft is under flight conditions, ice accretion is usually generated due to the lower temperatures. Similarly, dust, pollution and insects may accumulate on aircraft surfaces during operation of the aircraft, such as while in flight.

To simulate roughness simulation, the method may first select a type of surface roughness to be simulated on a surface of an aircraft part. In this step, an operator may select a surface roughness type, such as ice roughness, dust roughness or insect roughness. Once the surface roughness type is selected, the method retrieves parameters related to the selected surface roughness type. The parameters define the surface roughness type and may be based on parameters defied by an aeronautical certification authority for the different surface roughness types. These parameters include the maximum roughness and the density for each of the selectable surface roughness types. The maximum roughness corresponds to the vertical distance (roughness height) between the highest peak and the deepest valley along the complete extent of the surface roughness.

Using the parameters corresponding to the selected surface roughness type, the method obtains, e.g., generates, a pattern dimensioned according to the maximum roughness and density parameters retrieved for the selected surface roughness type. The pattern may be a projection lattice that comprises longitudinal projections and transverse projections perpendicular between them. The height of both the longitudinal and transverse projections corresponds to the maximum roughness parameter of the surface roughness type selected. This projection lattice comprises at least a recess formed between the intersection of two consecutive longitudinal projections and two consecutive transverse projections.

The pattern is applied to an aircraft part on which the selected surface roughness type is to be simulated.

The pattern may be applied to a portion of the aircraft part surface by using a laser to etch the pattern into the surface. The laser projects on the aircraft part surface to remove material from the surface to form the pattern. The formed pattern is the simulation of the selected surface roughness type.

The method embodying the invention allows for control of maximum roughness and density parameters of the simulated surface roughness. By using a computer-controlled laser to etch a pattern in the surface the simulated types of surface roughness can be reliably repeated on various surfaces of an aircraft. Being able to reliably repeat a surface roughness simulation enhances the reliability that aerodynamic performance data obtained from the aircraft part with the etched pattern accurately reflects the selected surface roughness type. That is, the data quality obtained by the present method is increased since this method is able to reproduce the same pattern for a particular surface roughness type.

A reason to control both maximum roughness and density is to ensure repeatability of the surface roughness simulation applied in different simulation tests. Repeatable surface roughness simulations ensure that the aerodynamic coefficients of surface roughness tests accurately reflect the selected surface roughness type. Conventional manual methods of forming simulated surface roughness on aircraft parts were prone to variations in the surface roughness. These variations affected the aerodynamic test data collected during wind tunnel tests of different aircraft parts with seemingly the same surface roughness. To obtain test data not affected by variations in the simulated surface roughness, many test were performed on many different parts with same simulated surface roughness to achieve repeatable test results. By contrast, the invention may be embodied to provide repeatably simulated surface roughness and thereby reduce the number of wind tunnel tests needed to evaluated aircraft parts.

The method may include testing the behavior of the aircraft part with the simulated surface roughness under flight conditions. The test may include positioning inside a wind tunnel the aircraft part with the simulated surface roughness, applying flight conditions within the wind tunnel by means of at least an air flow through the wing tunnel, and testing the aerodynamic behavior of the aircraft part in the air flow. Thus, the method may be used to collect information, e.g., data, about the aerodynamic behavior of the aircraft part with the selected simulated surface roughness.

The conventional method of applying a simulated surface roughness typically involves applying particles, such as microspheres or carborundum, which dirties the workspace surrounding the aircraft part and requires operators to wear masks and safety clothes. In contrast to this conventional method, the inventive method uses lasers to etch the simulated surface roughness which generates less dust and other debris.

Ice accretion, e.g., accumulation, on a wing or other aerodynamic surface can affect the airflow over a wing or other aircraft part and thus affect to aerodynamic performance of the wing or part and the aerodynamic control of the wing or part. The aerodynamic performance and control parameters that may be affected by ice accretion include: a decrease in maximum lift of the wing or other aerodynamic part, increase of stall speed of an aircraft, changing pitching moment characteristics of the aircraft near a stall condition and changing a type of stall to be experienced by the aircraft; decrease of maximum angle of attack and margin for stall for the aircraft; increase of aerodynamic drag of the wing or aircraft part; decrease of effectivity of horizontal tail plane and longitudinal stability; weight increases; engine trust decrease; and other performance degradations.

The pattern used to simulate the surface roughness may be a uniform lattice. The uniform lattice may be formed of uniform square, circular or triangular shapes. These shapes may be arranged in a uniform array to form the pattern. A uniform lattice pattern allows for good control of the density parameter of the simulated surface roughness. Also, a uniform formed of square shapes may have lattice may be etched with less manufacturing work than other uniform lattice shapes.

The laser may etch the pattern on a cryogenic steel surface of an aircraft part. This type of material is used for the aircraft part surface due to the cryogenic temperatures needed inside the wind tunnel in the testing step of the present method. The material forming the aircraft part onto which is etched In another particular embodiment, the material of the aircraft part surface is a material that resist, e.g., nominal dilatation and nominal cracking, the cryogenic conditions.

Before etching with the laser, the method may include configuring the laser to according to the parameters of the selected surface roughness type and to print the selected pattern. According to the geometry shape of the pattern, the laser may be configured to form, e.g., etch, the pattern on at least a portion of the surface of the aircraft part. The method may include configuring the power of the laser and cycle type of the laser to etch the designed pattern. The pattern may be defined by an electronic file selected during the method from an electronic library of patterns. The selected pattern may be chosen by the method as the pattern that best matches the selected type of surface roughness and the selected parameters for the surface roughness.

The laser used in a method embodying the invention may be a fiber laser generating a powerful beam and controllable to precisely apply the laser beam to the surface of the aircraft part to accurately form the pattern. The laser may ablate the surface of the aircraft part to form the etched pattern. The laser may be configured to ensure safety and minimize damage to areas near the surface of the aircraft part.

The simulate surface roughness types may include patterns the simulate surface roughness due to each of ice, dust, pollution and insects. Each pattern may have repeating shapes that correspond to a shape characterizing accumulations of ice, dust or insects on an aerodynamic surface of an aircraft part, such as a wing.

The surface onto which the pattern is etch may be that of, for example, a wing slat, a leading edge of a horizontal tail and a leading edge of a nacelle for an engine for aircraft flight propulsion.

The surface of the aircraft part to be etched should have a thickness substantially greater than the maximum roughness of the simulated roughness. Because the laser removes material from the surface while etching the pattern, the grooves, pits and other indentations formed in the surface should not be so deep that the structural integrity is compromised of the aircraft part. Thus, the aircraft parts formed for testing and to be etched by the laser may have a surface (skin) thickness greater than the thickness of the corresponding operational aircraft part for service in an aircraft. The skin of the aircraft part formed for testing may be thicker than the skin of the corresponding operational aircraft part by a dimension equal or substantially equal, i.e., within 10%, of the maximum depth of the grooves, pits or other indentations etched into the part formed for testing.

In another inventive aspect, the invention may be embodied as a method to test the behavior of an aircraft part under flight conditions, the method comprising the following steps:

i) providing an aircraft part with a surface roughness simulated on the surface of said aircraft part by the method according to the first inventive aspect, ii) positioning the aircraft part inside a wind tunnel, iii) applying flight conditions to the aircraft part by applying airflow over the aircraft part within the wind tunnel, and iv) testing the behavior of the aircraft part in the flight conditions.

The testing method reveals the aerodynamic behavior of the aircraft parts under flight conditions while the part has the simulated ice accumulation, debris or insect buildup.

The surface of the aircraft part may be coated with a simulated surface roughness formed by applying a uniform pattern on the surface. The uniform pattern may be repeating square shapes arranged in a regular array. The array of square shapes may be oriented at a certain angle with respect to an airflow in a wind tunnel of, for example 45°. Orienting the pattern at an oblique angle the airflow minimizes the deformations that occur to the square shapes in the pattern due to the airflow. Furthermore, orienting the pattern on the surface of the aircraft part at a 45° angle in the wind tunnel ensures that the pattern simulates a desired surface roughness on the part and presents an obstacle for the air flow flowing under simulated flight conditions in the wind tunnel. Thus, orienting the pattern at 45 degrees in the wind tunnel assists in accurately simulating the aerodynamic performance of the part with ice accumulation, a dirt coating or an insect coating on the skin of the part.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from an embodiment of the invention, given just as an example and not being limited thereto, with reference to the drawings.

DETAILED DESCRIPTION

Figure 1:
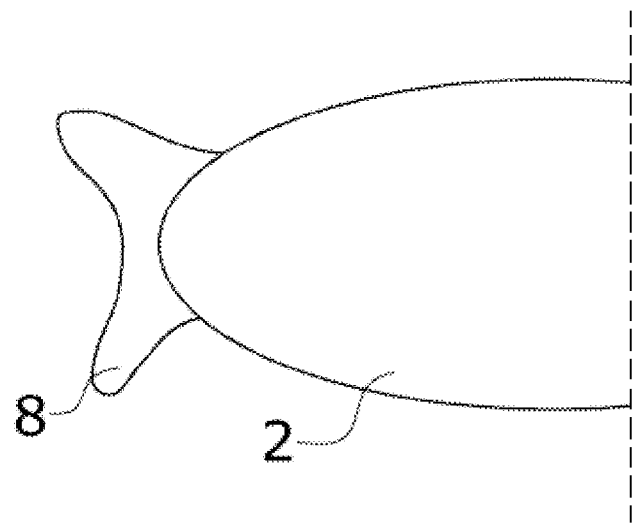
FIG. 1 shows a schematic cross sectional view of an aircraft slat with a double horn ice formed on its surface.
Figure 2:
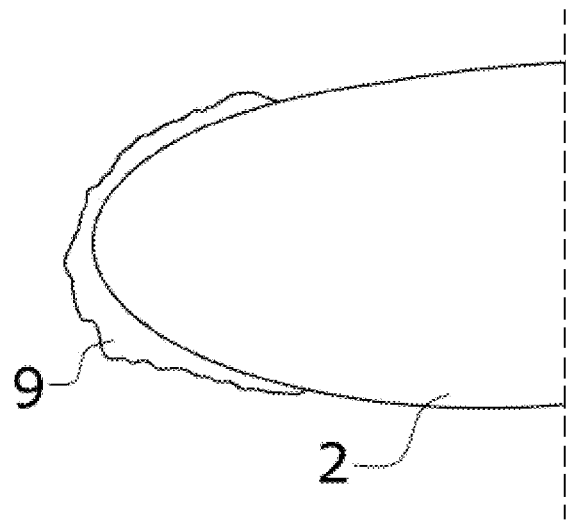
FIG. 2 shows a schematic view of an aircraft slat with roughness ice in the form of thin cover.
Figure 3:
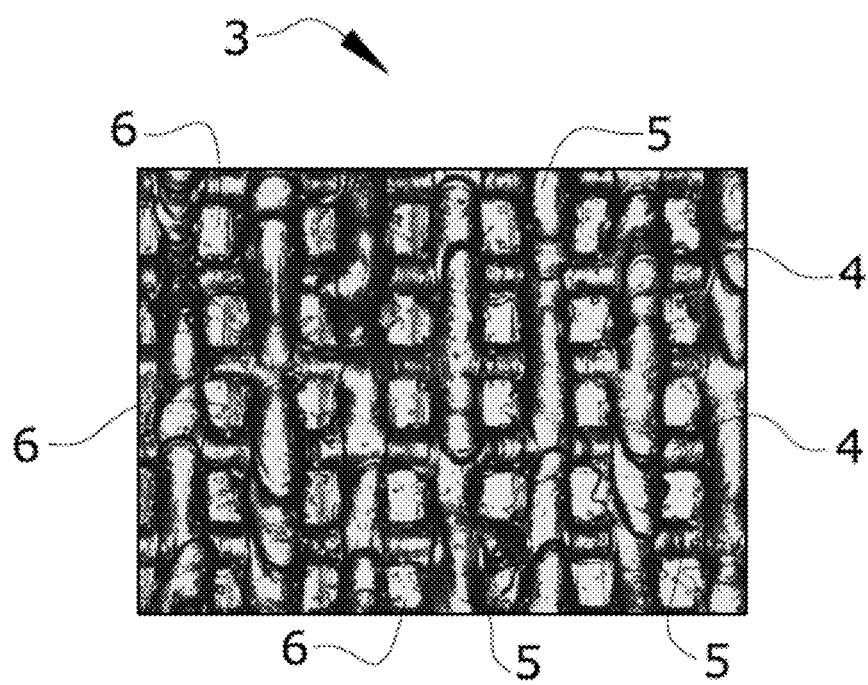
FIG. 3 shows a roughness pattern.
Figure 4:
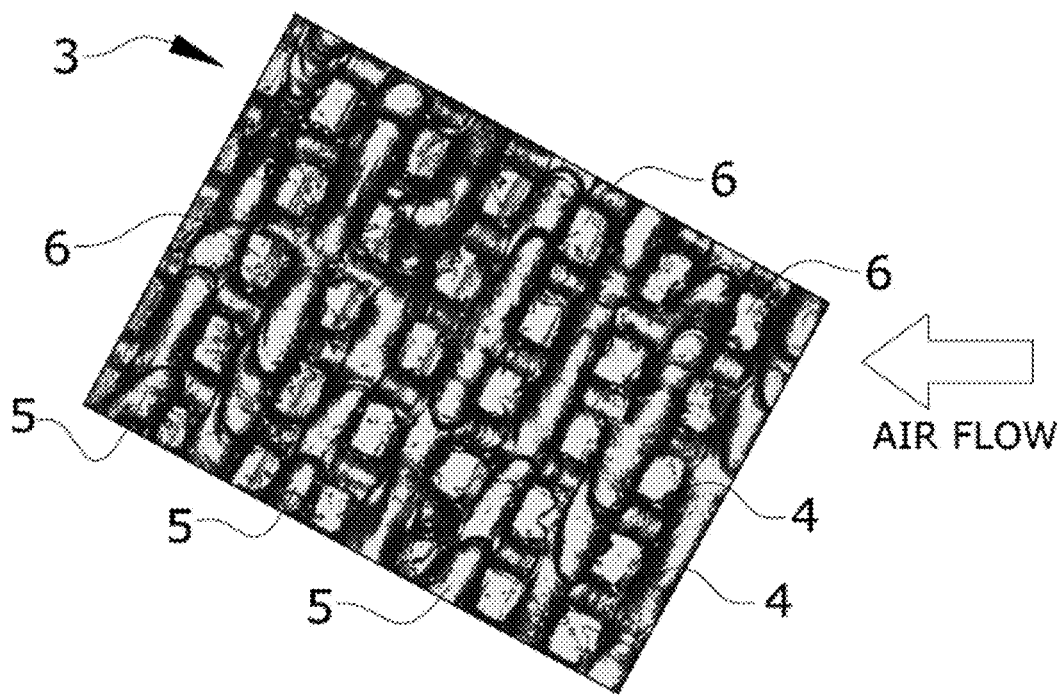
FIG. 4 shows another roughness pattern.

FIGS. 3 and 4 show a surface pattern (3) that corresponds to the geometry shape of a surface roughness of, for example ice. The surface pattern (3) is applied to the surface (1) of an aircraft part (2), such as the leading edge of a wing, vertical tail, or horizontal stabilizer. The geometry of the pattern (3) simulates a desired surface roughness and conforms to a selected surface roughness type and selected parameters of the desired surface roughness.

For example, the pattern (3) may be a square lattice including an array of longitudinal projections (4), e.g., a ridge, and transverse projections (5), e.g., a ridge wherein the longitudinal projections are perpendicular to the transverse projections (5). The pattern (3) also comprises recesses (3) formed at the intersections between two adjacent longitudinal projections (4) and two adjacent transverse projections (5). The pattern (3) simulates a desired surface roughness on the surface (1) of an aircraft part (2).

Figure 5:
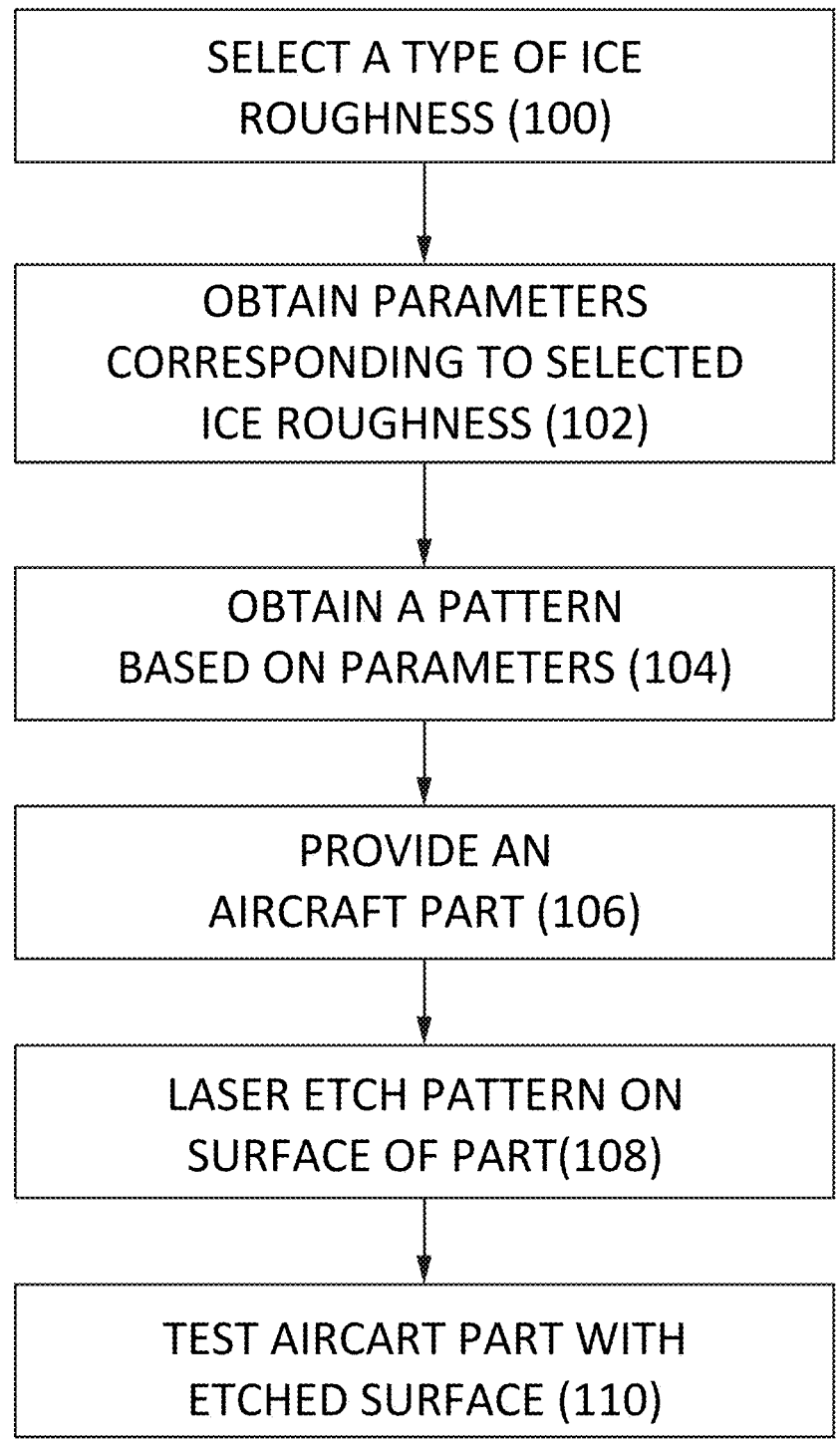
FIG. 5 is a flow chart of a method to etch the pattern in the surface of an aircraft part.

Simulation Method (FIG. 5):

A method is disclosed herein for simulating ice roughness on a surface (1) of at least an aircraft part (2), the method comprising: selecting a type of ice roughness to be simulated (100); obtaining parameters that characterize the selected ice roughness type, wherein the parameters include, at least, a maximum roughness and density of the selected ice roughness type (102); obtaining a pattern (3) that corresponds to the parameters (104), providing a surface of an aircraft part (2) on which to form the pattern (106), wherein the thickness of the surface is greater the maximum roughness of the parameter, forming the pattern (108) on at least a portion of the surface (1) of the aircraft part (2) by means of a laser, such as by using the laser to etch the surface to form the pattern in the surface, and using the pattern on the surface of the aircraft part (2) in tests (110) of performance, e.g., aerodynamic performance, of the part to simulate the performance of the part when coated with the ice corresponding to the selected ice roughness.

The pattern (3) may be a lattice comprising a plurality of longitudinal projections (4) and a plurality of transverse projections (5) being perpendicular to the longitudinal projections (4). The projections (4, 5) have a height in the pattern corresponding to a maximum roughness of selected surface roughness type. The height of the projections (4, 5) may be uniform along the lengths of each of the projections. A recess (6) is in spaces between adjacent longitudinal projections (4), except for intersections between the longitudinal and transverse projections (4, 5).

The pattern (3) may be a digital file stored in computer memory and used to drive a laser engraving system to project and form the pattern onto the surface (1). Exemplary patterns (3) are shown on FIGS. 3 and 4. The patterns shown in FIGS. 3 and 4 are laser etched patterns in an outer surface of a skin of an aircraft part, such as a pattern etched in a cryogenic steel layer on the skin of the aircraft part.

The user selects an ice roughness type corresponding to a roughness ice shape. The selectable ice roughness types may be one or more of the general ice type classifications including roughness ice, small ice, double horn ice, and ridge ice. In addition to selecting the ice roughness type, selections may be made for a maximum roughness parameter and a density parameter. The parameter values and dimensions for the maximum roughness and density make those established by an aeronautical certification authority, e.g., the Federal Aviation Authority. Each of the selectable ice roughness types may have corresponding one or more values of maximum roughness and density for the ice.

Once the ice roughness type has been selected and the pattern (3) is determined, an aircraft part is obtained, such as a slat, leading edge of a wing or leading edges of vertical or horizontal stabilizer. The aircraft part is for testing of the aerodynamic performance of the part when coated with ice or other similar surface irregularity such as dirt. The aircraft part may have an increased thickness of the skin which is subject to icing. The increased thickness is to allow the pattern (3) to be laser etched into the skin without forming holes in the skin or reducing the structural strength of the skin so that is not suited for testing. The thickness of the aircraft part for testing may be increased over the design thickness of the skin by a distance corresponding to the height of the projections (4, 5) in the pattern to be etched into the skin. Similarly, the thickness of the skin of the aircraft part (2) should be greater than the maximum roughness parameter of the ice roughness type selected for the pattern.

The skin of the aircraft part (2) may be thickened by adding a layer of a cryogenic steel material to the outside surface of the aircraft part. Thus, the method may include modifying an aircraft part (2) by increasing the thickness of the skin by adding a cryogenic steel material to an outer surface of the part at a position on the surface where ice is predicted to form during flight of an aircraft.

The pattern (3) is formed on the surface (1) of the skin of the aircraft part (2) by using a laser beam to etch the pattern into the surface. A computer-controlled laser etching device is positioned at the aircraft part or the aircraft part is mounted into the device. The laser is projected onto the surface of the aircraft part and moved across the surface to etch the pattern (3) into the surface. For example, the laser beam removes portions of a cryogenic steel layer on the surface of the aircraft part to etch the pattern in the cryogenic steel layer to form the pattern in the layer. The laser etching may be performed by controlling the position and power of the laser to remove material from the outer surface of the skin, e.g., a surface of a cryogenic steel layer, to form the pattern on the outer surface of the skin.

Figure 6:
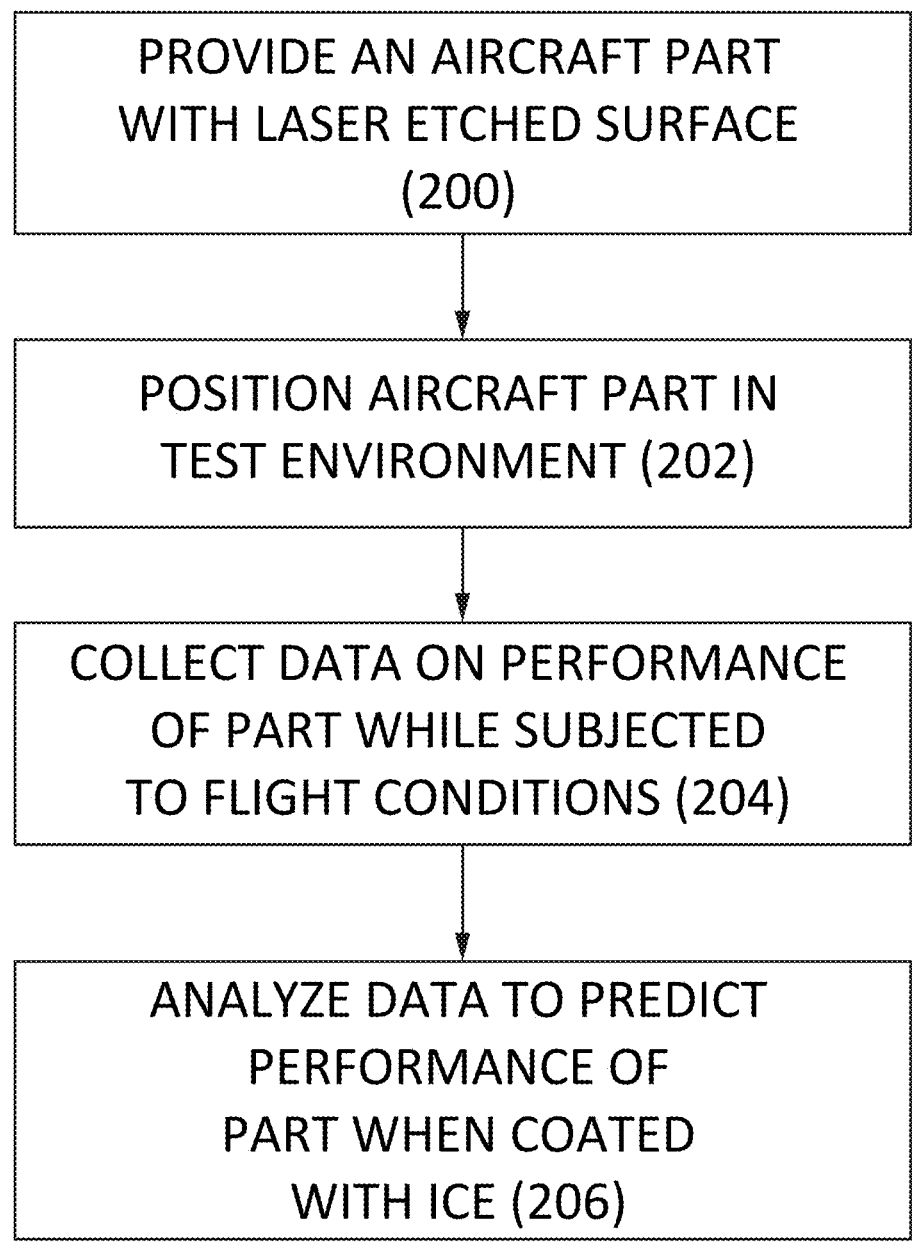
FIG. 6 is a flow chart of a method to test the aircraft part.

Testing Method (FIG. 6)

After the pattern is formed on the outer skin of the aircraft part, the pattern may be used to simulate the selected ice roughness type on the aircraft part. The testing may include testing the aircraft part (2) with the pattern (3) etched onto a surface in actual flight conditions of an aircraft which includes the aircraft part or in tests, e.g., wind tunnel tests, that simulate aerodynamic conditions of the flight of an aircraft.

The method for testing the behavior of the aircraft part with the simulated ice roughness type under flight conditions may include:

providing the aircraft part (2) with the selected ice roughness simulated on the surface (1) (200);

ii) positioning the aircraft part (2) inside a wind tunnel or flying an aircraft with the aircraft part (2) in flight conditions (202);

iii) collecting data on the aerodynamics and performance of the aircraft part while air flow is applied in the wind tunnel to simulate actual flight conditions or while the aircraft is in flight (204);

iv) analyzing the collected data and determine the performance of the aircraft part while ice with the selected ice roughness type coats the outer surface of the part (206).

This method allows for testing of the aerodynamic behavior under flight conditions of an aircraft part (2) with ice roughness simulated on the surface (1) of the aircraft part.

The method provides an aircraft part (2) with ice roughness simulated on its surface (2) by means of laser etching of a pattern onto the surface, wherein the pattern simulates a selected ice roughness. The testing may be performed while the aircraft part (2) with the pattern etched in its outer surface in a wind tunnel wherein flight conditions are applied by an air flow onto the aircraft part. While the aircraft part (2) is under flight condition inside the wind tunnel, the aerodynamic behavior of this aircraft part (2) is tested.

In a particular example, when the aircraft part (2) with ice roughness simulated by the pattern, which may have a uniform square lattice as shown in FIGS. 3 and 4 is introduced into the wind tunnel. While in the wind tunnel, the aircraft part (2) may be rotated 45° with respect to the air flow direction in the tunnel, such as is illustrated in FIG. 4. Orienting the pattern (3) at an oblique angle, e.g., 45 degrees or in a range of 40 to 50 degrees, to the airflow minimizes deformations caused by the airflow that may occur to the square shapes in the pattern (3). Furthermore, orienting the pattern on the surface of the aircraft part at a 45° angle in the wind tunnel ensures that the pattern simulates a desired surface roughness on the part and presents an obstacle for the air flow flowing under simulated flight conditions in the wind tunnel. Thus, orienting the pattern at 45 degrees in the wind tunnel assists in accurately simulating the aerodynamic performance of the part with ice accumulation, a dirt coating or an insect coating on the skin of the part.

Figure 7:
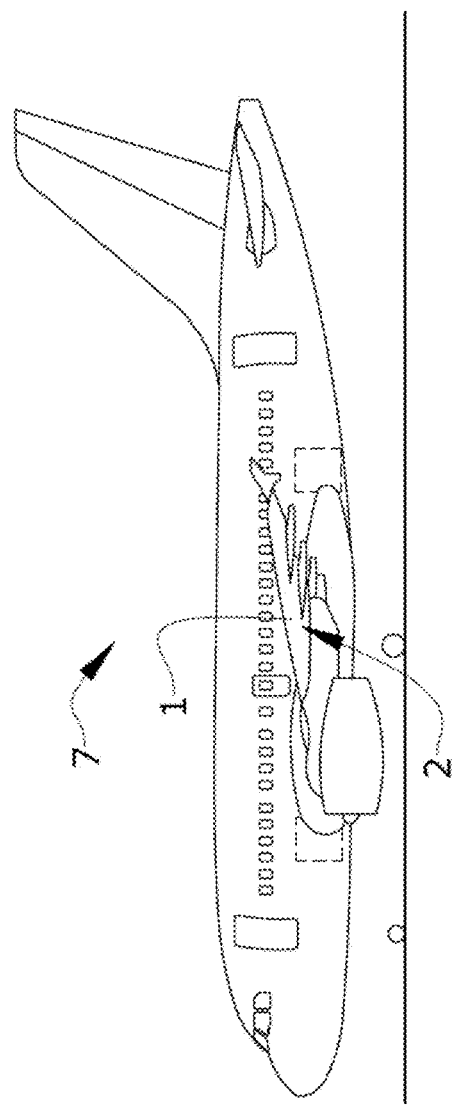
FIG. 7 shows an aircraft.

FIG. 7 shows an aircraft (7) comprising a slat (2) as an aircraft part comprising a surface roughness simulated on its surface (1) according to the obtained pattern (3) shown on FIGS. 3-4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for simulating a surface roughness type on a surface of an aircraft part, the method comprising:

a) selecting a surface roughness type to be simulated, b) providing or determining parameters associated to the selected surface roughness type, wherein the parameters comprise a maximum roughness of the selected surface roughness type and a density of the selected surface roughness type, c) obtaining a pattern that corresponds to the parameters, d) providing a thickness of a skin having the surface, wherein the thickness is greater than the maximum roughness parameter, and e) forming the pattern on at least a portion of a rigid surface of the skin by laser etching the pattern into the surface;

wherein the pattern is a projectable lattice comprising a plurality of longitudinal projections and a plurality of transverse projections being perpendicular to the longitudinal projections, both of the pluralities of longitudinal and transverse projections have heights corresponding to the maximum roughness of selected surface roughness type, and a spacing between adjacent ones of the longitudinal projections corresponds to the density parameter.

2. The method according to claim 1, wherein the pattern is a uniform lattice.

3. The method according to claim 1, wherein the pattern is a uniform square lattice.

4. The method according to claim 1, wherein the surface is a surface of layer of cryogenic steel of the aircraft part.

5. The method according claim 1, further comprising configuring the laser to etch the pattern into the surface.

6. The method according to claim 1, wherein the laser is a fiber laser.

7. The method according to claim 1, wherein the surface roughness at least comprises one of the following: ice, dust, pollution, and insects.

8. The method according to claim 7, wherein the pattern corresponds to the geometry shape of a roughness ice.

9. The method according to claim 1, wherein the aircraft part is a slat.

10. The method according to claim 1, wherein the parameters are predetermined parameters provided by a certification authority.

11. The method according to claim 1, wherein the pattern is formed by removing portions of materials of the surface by the projection of the laser.

12. A method for testing an aerodynamic behavior under flight conditions of an aircraft part, the method comprising:

providing an aircraft part with a simulated surface roughness laser etched into a rigid surface of said aircraft part, positioning the aircraft part inside a wind tunnel, applying flight conditions within the wind tunnel by directing an airflow through the wind tunnel over the aircraft part in the wind tunnel, and testing the behavior of the aircraft part.

13. The method according to claim 12, wherein when the aircraft part provided comprises a uniform square pattern of longitudinal and transverse ridges, and the method further comprises orienting the pattern in the wind tunnel such that a direction of the airflow through the tunnel is at an oblique angle to both the longitudinal and transverse ridges.

14. The method according to claim 13, wherein the oblique angle is in a range of forty to fifty degrees to the applied air flow.

15. A method comprising:

selecting a surface roughness type to be simulated, identifying or determining parameters associated with the selected surface roughness type, wherein the parameters include a maximum roughness and a density of the selected surface roughness type, obtaining a pattern based on the parameters, wherein the pattern is a projectable lattice comprising a plurality of longitudinal projections and transverse projections perpendicular to the longitudinal projections, and a spacing between adjacent ones of the longitudinal projections corresponds to the density parameter;

etching the pattern onto a rigid surface of an aircraft part by a laser controlled to etch the pattern into the surface, wherein a depth etched by the laser in the spaces between the adjacent longitudinal projections corresponds to a dimension of the maximum roughness parameter, and obtaining the aircraft part with the pattern in the surface which corresponds to the selected roughness type.

16. A method comprising:

selecting a surface roughness type to be simulated, identifying or determining parameters associated with the selected surface roughness type, wherein the parameters include a maximum roughness and a density of the selected surface roughness type, obtaining a pattern based on the parameters, wherein the pattern is a projectable lattice comprising a plurality of longitudinal projections and transverse projections perpendicular to the longitudinal projections, and a spacing between adjacent ones of the longitudinal projections corresponds to the density parameter;

applying a metal layer to an aircraft part;

etching the pattern onto a surface of the metal layer by a laser controlled to etch the pattern into the surface, wherein a depth etched by the laser in the spaces between the adjacent longitudinal projections corresponds to a dimension of the maximum roughness parameter, and obtaining the aircraft part with the pattern in the surface which corresponds to the selected roughness type.

17. The method of claim 15, wherein the surface roughness is selected from a group comprising roughness ice and double horn ice.

18. The method of claim 15, wherein the depth etched in the spaces between the longitudinal projections is uniform along the lengths of the longitudinal projections except in regions where the longitudinal projections intersect with the transverse projections.

19. The method of claim 15, wherein aircraft part is a leading edge of at least one of a slat, wing, vertical stabilizer and horizontal stabilizer.

* * * * *